(12) United States Patent
Dremann

(10) Patent No.: US 11,730,272 B1
(45) Date of Patent: Aug. 22, 2023

(54) ELASTIC STORAGE DEVICE

(71) Applicant: Paul Dremann, Punta Gorda, FL (US)

(72) Inventor: Paul Dremann, Punta Gorda, FL (US)

( * ) Notice: Subject to any disclaimer, the term of this patent is extended or adjusted under 35 U.S.C. 154(b) by 0 days.

(21) Appl. No.: 17/860,248

(22) Filed: Jul. 8, 2022

(51) Int. Cl.
*A47C 7/62* (2006.01)
*B60R 11/00* (2006.01)

(52) U.S. Cl.
CPC ......... *A47C 7/62* (2013.01); *B60R 2011/0015* (2013.01)

(58) Field of Classification Search
CPC .............. B60N 3/02; B60R 2011/0012; B60R 2011/0015; B60R 2011/0017; A47C 7/62
See application file for complete search history.

(56) References Cited

U.S. PATENT DOCUMENTS

| | | | | |
|---|---|---|---|---|
| 3,727,874 A | * | 4/1973 | Wuensch | G09F 1/065 248/459 |
| 3,851,762 A | * | 12/1974 | Liblick | B65D 73/0028 206/478 |
| 5,407,167 A | * | 4/1995 | Michaelis | B60R 7/043 248/441.1 |
| 2009/0065540 A1 | * | 3/2009 | Pantoja | B60R 11/02 224/275 |
| 2013/0214119 A1 | * | 8/2013 | Antonioni | F16M 13/022 248/614 |
| 2018/0027987 A1 | * | 2/2018 | Calhoun | A47C 7/62 |
| 2020/0245737 A1 | * | 8/2020 | Ali | A45C 7/005 |

FOREIGN PATENT DOCUMENTS

| | | | | |
|---|---|---|---|---|
| DE | 29912808 U1 | * | 10/1999 | ............. A47C 31/11 |
| DE | 202005012035 U1 | * | 12/2005 | ............. B60N 3/02 |
| DE | 102020133054 A1 | * | 6/2021 | ............. B60N 2/64 |
| EP | 3118055 A1 | * | 1/2017 | ............. B60N 2/58 |
| KR | 20100006662 U | * | 2/2010 | |
| KR | 20170001348 A | * | 1/2017 | |
| WO | WO-2020030723 A1 | * | 2/2020 | ............. B60N 2/265 |

* cited by examiner

*Primary Examiner* — Timothy J Brindley
(74) *Attorney, Agent, or Firm* — Loeffler IP Group, P.A.; Bryan L. Loeffler, Esq.

(57) ABSTRACT

An elastic storage device (1) for audience seating that provides storage for articles, such as event programs by providing an elastic support ribbon tensioned between two adhesive anchors (7, 8) that prevent ends of the elastic ribbon from slipping and failing with use. In addition, the present invention provides packaging (16) for the elastic storage device that doubles as an installation tool for installing the elastic storage device on a surface and ensuring a proper distance and tension between the two adhesive anchors.

13 Claims, 4 Drawing Sheets

ELASTIC STORAGE DEVICE

FIELD OF THE INVENTION

The present invention relates primarily to audience seating found in theatres, arenas, stadiums, auditoriums, and other venues, and more particularly, to an elastic storage device that is mountable to a back of a seat for the primary purpose of storing articles, such as event programs, playbills, magazines, and so forth.

BACKGROUND OF THE INVENTION

Theaters and other entertainment venues generally provide seating for guests and spectators with rows of flip-up style seats. These venues are designed to seat large numbers of individuals in a given area, which can result in limited storage, especially for printed articles, such as event programs. Audience members are commonly forced to hold or sit on event programs and other articles, if they want to keep them in good clean condition for saving. This makes it difficult for audience members to relax and interferes with activities that require both hands, such as clapping. When standing items left on the seat commonly fall behind the seat on the dirt dark floor. The common alternative is to misplace the event program or try to roll and bend the event program so it will fit in a pocket or purse.

As a result, a need exists for an elastic storage device for audience seating that provides storage for articles, such as event programs, playbills, magazines, and so forth.

SUMMARY OF THE INVENTION

The primary object of the present invention is to provide an elastic storage device that will remain securely anchored to a surface and not lose its integrity over time.

An additional object of the present invention is to provide an elastic storage device having packaging that doubles as a tool used to expedite the attachment of the elastic storage device on a seatback surface.

An additional object of the present invention is to provide an elastic storage device that does not damage or alter the surface to which it is being attached.

The present invention fulfills the above and other objects by providing an an elastic storage device having packaging that doubles as a tool used to install the elastic storage device on a surface.

having adhesive anchors on opposing ends thereof. Each anchor is preferably constructed from three layers of adhesive foam pads wherein a bottom adhesive foam pad, a middle adhesive foam pad, and a top adhesive foam pad are stacked on each other to sandwich folded ends of the elastic ribbon in each anchor.

Specifically, opposing end portions of the elastic support ribbon is folded around a respective middle adhesive foam pad and back onto itself where it is secured in place using an adhesive. The bottom adhesive foam pad and top adhesive foam pad are then adhered to the middle adhesive foam pad and the folded portion of the elastic support ribbon to sandwich and lock each folded portion of elastic ribbon in its respective anchor and prevent the ends from slipping out of the anchors. Adhesive and a peel away cover are located on a bottom surface of the bottom adhesive foam pad to allow the anchors to be mounted to a rear surface of a seat back or other surface.

The anchors are preferably mounted at a distance from each other to place a sufficient amount of tension on the elastic support ribbon. The packaging for the elastic storage device doubles as a tool by acting as a template and spacer for temporarily holding the anchors apart while the adhesive between the bottom adhesive pads and the mounting surface sets.

The elastic storage device of the present invention may support an advertisement holder having a clear sleeve that is preferably sized to hold a business card or similar rectangular-shaped card having advertising or other indicia printed thereon The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
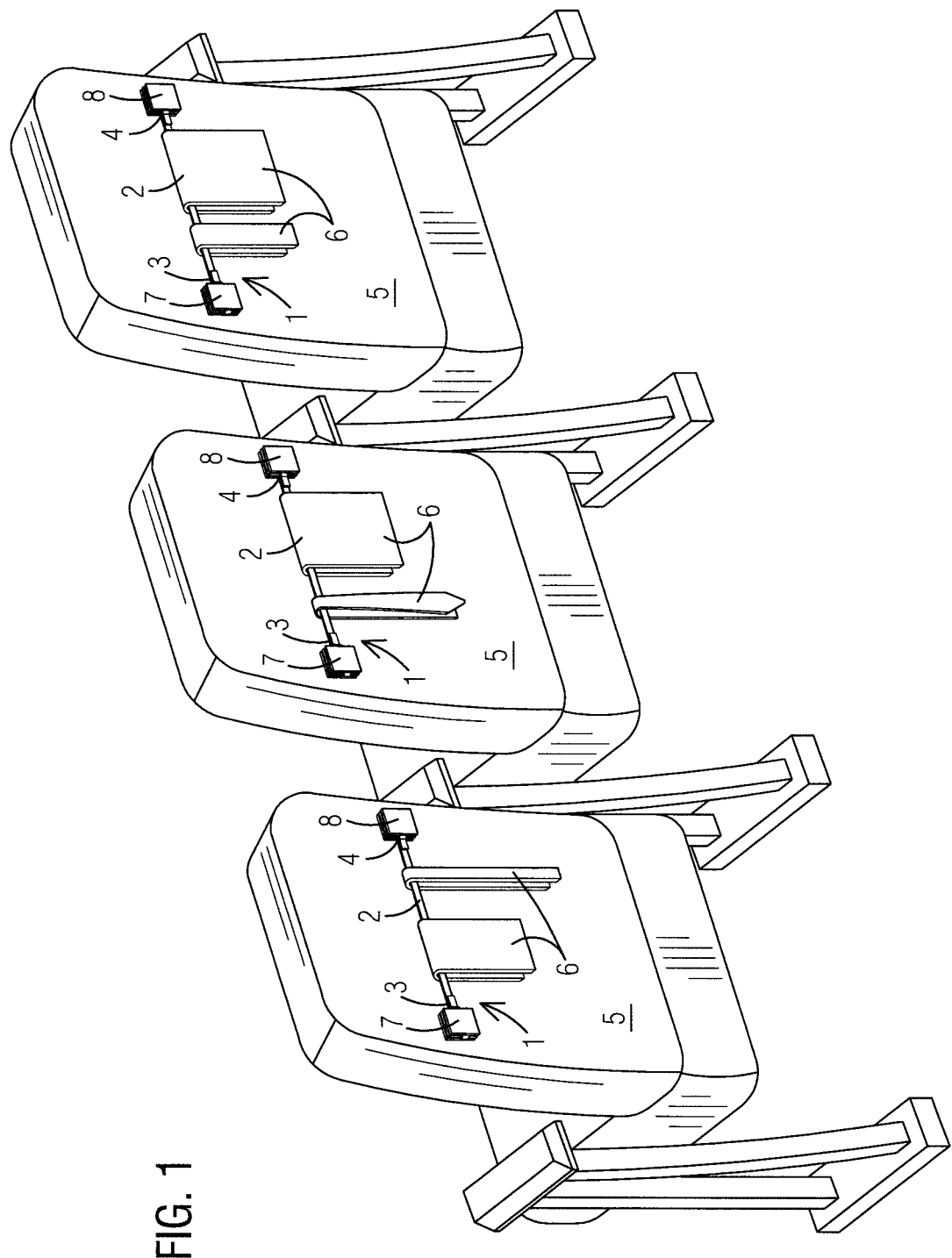
FIG. 1 is a perspective rear view of a row of audience seating in an entertainment venue showing elastic storage devices of the present invention installed thereon.

For purposes of describing the preferred embodiment, the terminology used in reference to the numbered accessories in the drawings is as follows:
1. elastic storage device, generally
2. elastic ribbon
3. first end of elastic ribbon
4. second end of elastic ribbon
5. seat back
6. personal article
7. first anchor
8. second anchor
9. bottom layer of anchor
10. middle layer of anchor
11. top layer of anchor
12. attachment means
13. adhesive
14. peel-away cover
15. bottom surface of anchor
16. packaging
17. panel
18. first aperture
19. second aperture
20. first side edge of panel
21. second side edge of panel
22. indentation
23. inner edge of aperture
24. vertical crease
25. advertising
26. advertising holder With general reference to FIG. 1, a perspective rear view of a row of audience seating in an entertainment venue showing elastic storage devices 1 of the present invention installed thereon is illustrated. The elastic storage device 1 comprises an elongated elastic ribbon 2 having a first end 3 and a second end 4 secured to a rear surface of a seat back 5 by a first adhesive anchor 7 and a second adhesive anchor 8, respectively. Personal articles 6, such as event programs, playbills, magazines, and other personal objects may be hung on the elastic storage device 1 during an entertainment event.

Figure 2:
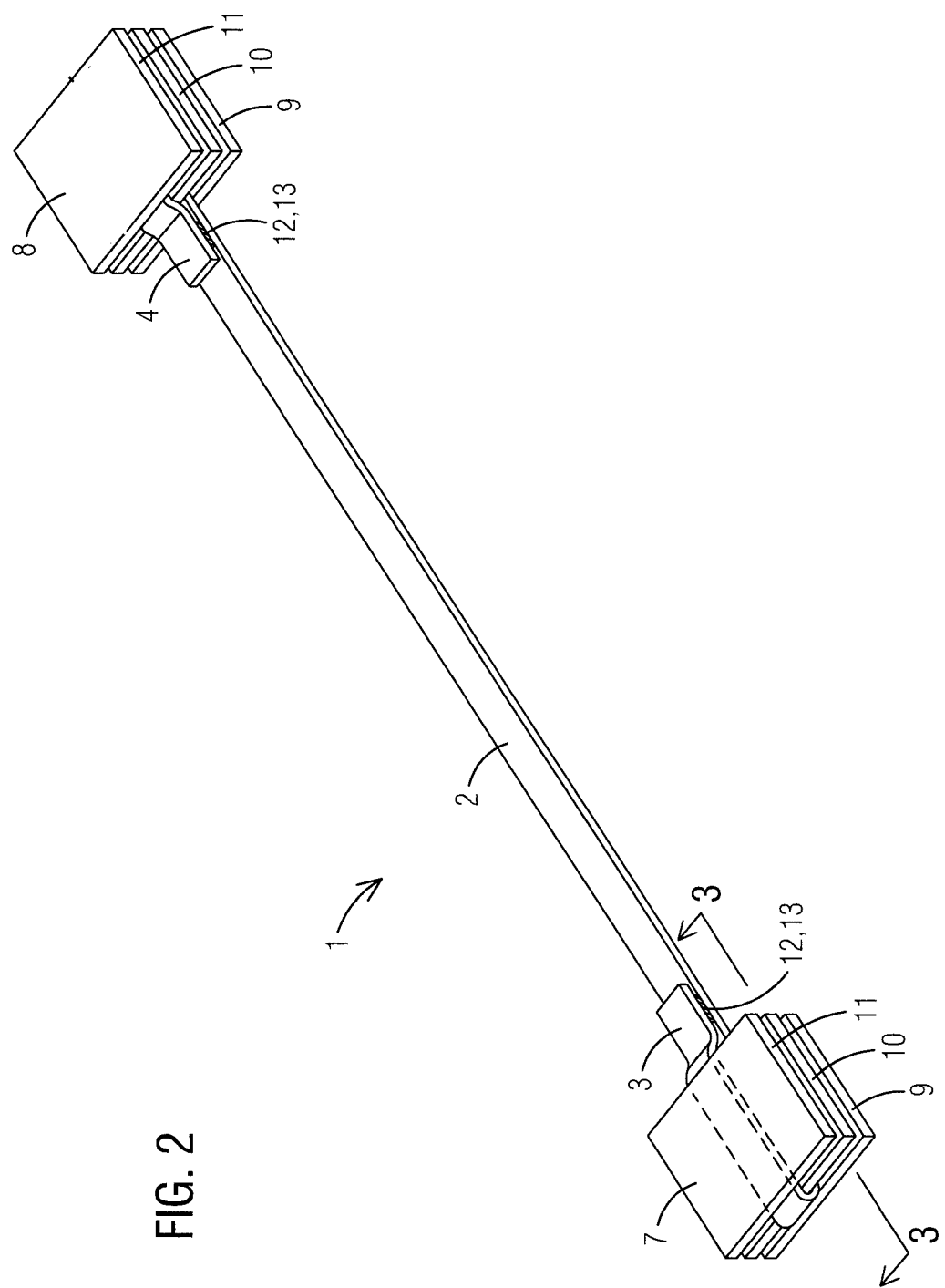
FIG. 2 is a side view of the elastic storage device of the present invention and the adhesive anchors thereof.
Figure 3:
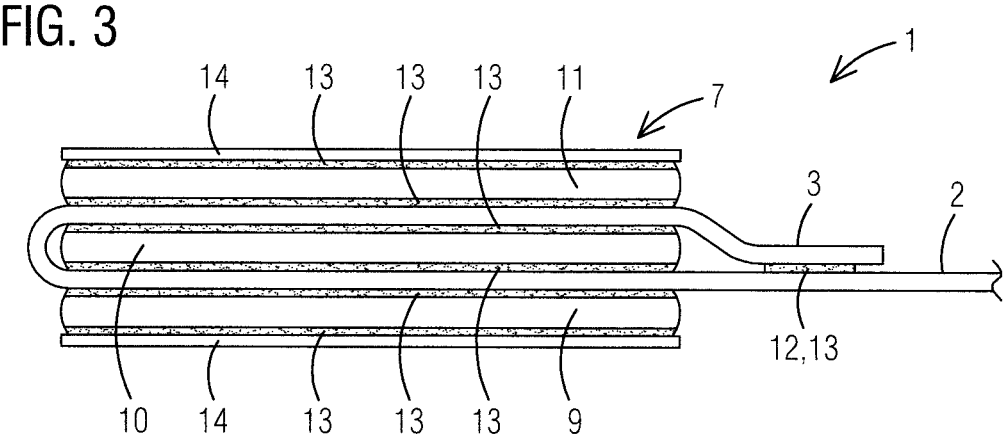
FIG. 3 is a sectional view along lines 3-3 of FIG. 2.

With general reference to FIGS. 2 and 3, a perspective plan view of the elastic storage device 1 of the present invention and the adhesive anchors 7 and 8 thereof and a sectional view along lines 3-3 of FIG. 2, respectively, are illustrated. The elastic storage device 1 comprises an elongated elastic ribbon 2 having a first end 3 secured in a first adhesive anchor 7; and a second end 4 secured in a second adhesive anchor 8. Each anchor 7 and 8 is preferably substantially rectangular-shaped and constructed from at least three layers comprising a bottom layer 9, a middle layer 10, and a top layer 11. To secure the first end 3 and the second end 4 of the elastic ribbon 2 in the anchors 7 and 8, each are folded around respective middle layers 10 of the first adhesive anchor 7 and the second adhesive anchor 8. Then, the first end 3 and the second end 4 of the elastic ribbon 2 are each folded back onto the main body of the elastic ribbon 2 and attached to the main body of the elastic ribbon 2, using an attachment means 12, such as adhesive 13, sewing, heat welds, etc.

Figure 4:
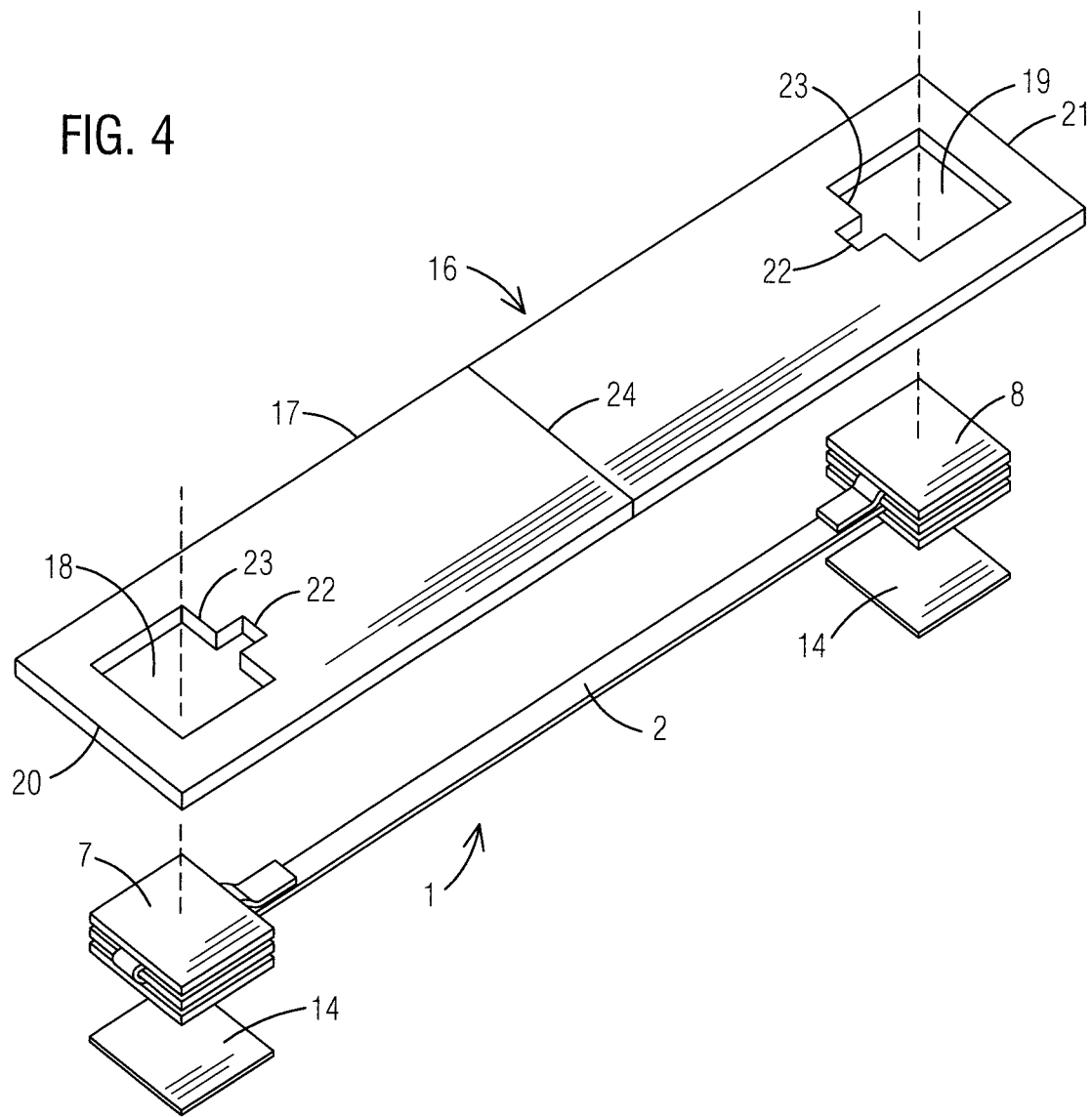
FIG. 4 is a perspective exploded side view of an elastic storage device and packaging of the present invention in an open position for installation.

Next, the bottom layers 9 and the top layers 11 are adhered to the middle layers 10 of the first anchor 7 and the second anchor 8 to sandwich and lock the first end 3 and second end 4 of the elastic ribbon 2 therein. Adhesive layers 13 and peel-away covers 14 are located on bottom surfaces 15 of the first anchor 7 and the second anchor 8, respectively, to allow the anchors 7 and 8 and elastic support ribbon 2 to be mounted to a seat back, as illustrated in FIG. 1. Advertising 25 or other indicia may be added to the elastic storage device 1, such as on the first anchor 7 and/or the second anchor 8 so it is visible to audience members. An advertisement holder 26 may be attached to the elastic storage device 1 using an attachment means 12, such as adhesive 13. The advertisement holder 26 comprises a clear sleeve that is preferably sized to hold a business card or similar rectangular-shaped card having advertising 26 or other indicia printed thereon. With general reference to FIG. 4, a perspective side view of an elastic storage device 1 and packaging 16 of the present invention in an open position for installation is illustrated. The packaging 16 comprises a substantially rectangular-shaped panel 17 having a thickness that is approximately the same thickness as the first anchor 7 and the second anchor 8, respectively. A first aperture 18 and a second aperture 19 respectively located adjacent to a first side edge 20 and a second side edge 21 of the panel 17. The first aperture 18 and the second aperture 19 are preferably substantially rectangular-shaped to engage and hold the substantially rectangular-shaped first anchor 7 and second anchor 8 therein with a pressure fit. Indentations 22 may be located on inner edges 23 of the first aperture 18 and the second aperture 19 to accommodate the added thickness of the elastic ribbon 2 being folded over itself on each end.

Figure 5:
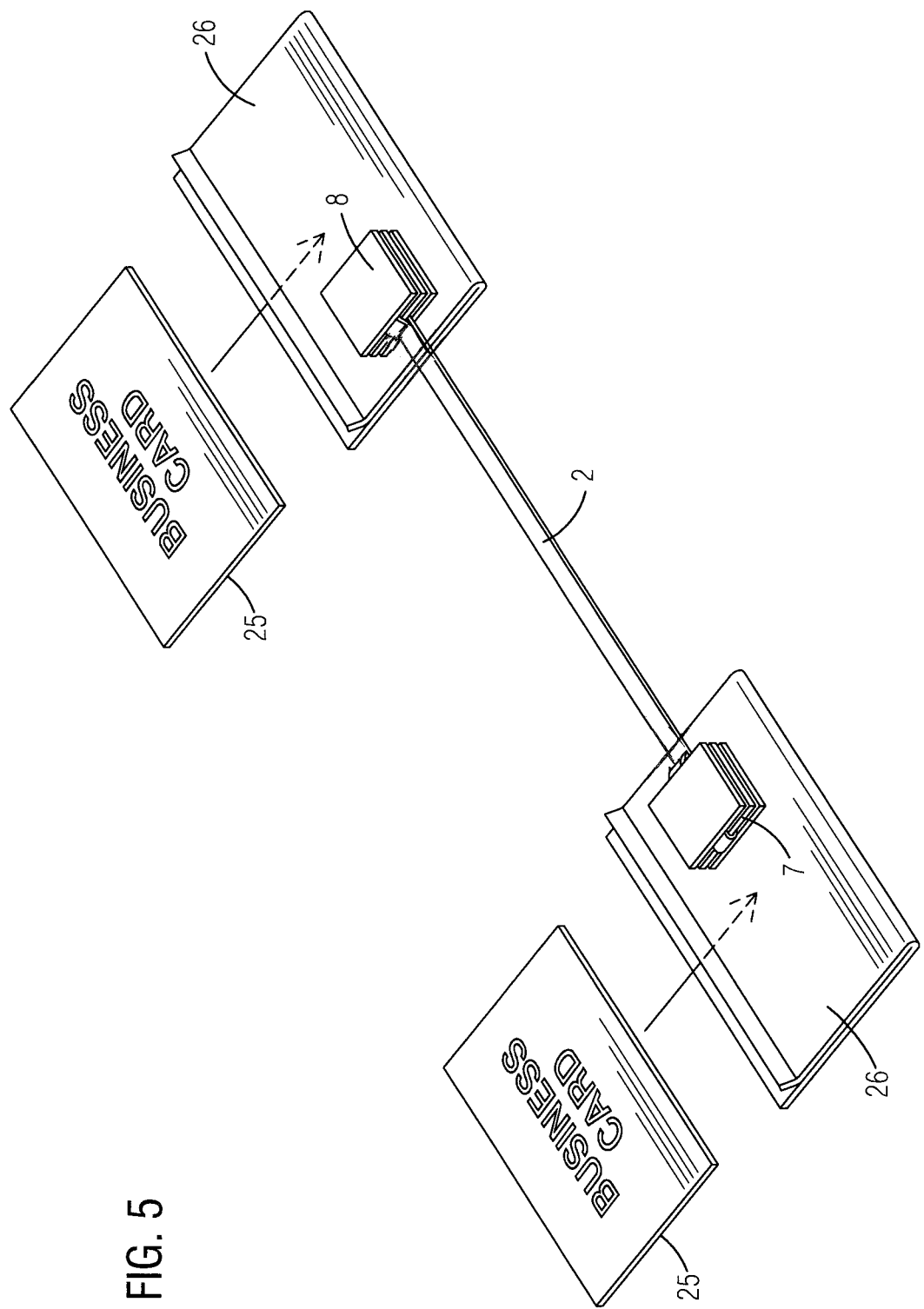
FIG. 5 is a perspective front view of an elastic storage device of the present invention having advertising holders.

A vertical crease 24 is centered on the panel 17 to allow the packaging 16 to be folded in half for shipping and storage purposes. The first anchor 7 and the second anchor 8 must be installed at a distance from each other that places a sufficient amount of tension on the elastic ribbon 2. The packaging 17 acts a temporary support maintaining a desired distance between the first anchor 7 and the second anchor 8 while the adhesive 13 on the bottom surfaces 15 of the first anchor 7 and the second anchor 8 dries to a surface. Finally, advertisement holders 26 may be attached to the elastic storage device 1 using an attachment means 12, such as adhesive 13. The advertisement holders 26 each comprise a clear sleeve that is preferably sized to hold a business card or similar rectangular-shaped card having advertising 25 or other indicia printed thereon, as illustrated in FIG. 5. The elastic support ribbon 2 may be glow in the dark to assist with finding and the device 1 in the dark.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. An elastic storage device primarily for use on seatbacks, said elastic storage device comprising:
   an elongated elastic ribbon having a first end and a second end;
   said first end of elastic ribbon being attachable to a rear surface of a seat back by a first adhesive anchor; and
   said second end of elastic ribbon being attachable to a rear surface of the seat back by a second adhesive anchor, respectively;
   said first adhesive anchor comprises a bottom layer, a middle layer, and a top layer wherein said first end of the elastic ribbon is folded over said middle layer of the first adhesive anchor and back onto itself being secured in place using an attachment means;
   wherein said bottom layer, middle layer, and top layer of said first adhesive anchor are adhered together to sandwich and lock said folded over first end of said elongated ribbon therein;
   said second adhesive anchor also comprises a bottom layer, a middle layer, and a top layer wherein said second end of the elastic ribbon is folded over said middle layer of the second adhesive anchor and back onto itself being secured in place using an attachment means; and
   wherein said bottom layer, middle layer, and top layer of said second adhesive anchor are adhered together to sandwich and lock said folded over second end of said elongated ribbon therein;
   an adhesive layer and peel-away cover located on a bottom surface of said first anchor; and
   an adhesive layer and peel-away cover located on a bottom surface of said second anchor.

2. The elastic storage device of claim 1 further comprising:
   packaging having a substantially rectangular-shaped panel having a substantially rectangular-shaped first aperture located adjacent to a first side edge of the panel and a substantially rectangular-shaped second aperture located adjacent to a second side edge of the panel; and
   a vertical crease centered on the panel to allow the packaging 16 to be folded in half for shipping and storage purposes.

3. The elastic storage device of claim 2 further comprising:
   indentations on inner edges of the first aperture and the second aperture to accommodate added thickness of the elastic ribbon being folded over itself on a first end and second end thereof.

4. The elastic storage device of claim 1 further comprising:
   an advertising holder attached thereto.
5. The elastic storage device of claim 1 wherein:
   said elastic ribbon is capable of glowing in the dark.
6. An elastic storage device primarily for use on seatbacks, said elastic storage device comprising:
   an elongated elastic ribbon having a first end and a second end;
   said first end of elastic ribbon being attachable to a rear surface of a seat back by a first adhesive anchor;
   said second end of elastic ribbon being attachable to a rear surface of the seat back by a second adhesive anchor, respectively;
   said first adhesive anchor comprises a bottom layer, a middle layer, and a top layer wherein said first end of the elastic ribbon is folded over said middle layer of the first adhesive anchor and back onto itself being secured in place using an attachment means;
   wherein said bottom layer, middle layer, and top layer of said first adhesive anchor are adhered together to sandwich and lock said folded over first end of said elongated ribbon therein;
   said second adhesive anchor also comprises a bottom layer, a middle layer, and a top layer wherein said second end of the elastic ribbon is folded over said middle layer of the second adhesive anchor and back onto itself being secured in place using an attachment means; and
   wherein said bottom layer, middle layer, and top layer of said second adhesive anchor are adhered together to sandwich and lock said folded over second end of said elongated ribbon therein;
   an adhesive layer and peel-away cover located on a bottom surface of said first anchor; and
   an adhesive layer and peel-away cover located on a bottom surface of said second anchor.
7. The elastic storage device of claim 6 further comprising:
   packaging having a substantially rectangular-shaped panel having a substantially rectangular-shaped first aperture located adjacent to a first side edge of the panel and a substantially rectangular-shaped second aperture located adjacent to a second side edge of the panel; and
   a vertical crease centered on the panel to allow the packaging 16 to be folded in half for shipping and storage purposes.
8. The elastic storage device of claim 7 further comprising:
   indentations on inner edges of the first aperture and the second aperture to accommodate added thickness of the elastic ribbon being folded over itself on a first end and second end thereof.
9. The elastic storage device of claim 6 further comprising:
   an advertising holder attached thereto.
10. The elastic storage device of claim 6 wherein:
    said elastic ribbon is capable of glowing in the dark.
11. An elastic storage device primarily for use on seatbacks, said elastic storage device comprising:
    an elongated elastic ribbon having a first end and a second end;
    said first end of elastic ribbon being attachable to a rear surface of a seat back by a first adhesive anchor;
    said second end of elastic ribbon being attachable to a rear surface of the seat back by a second adhesive anchor, respectively;
    packaging having a substantially rectangular-shaped panel having a substantially rectangular-shaped first aperture located adjacent to a first side edge of the panel and a substantially rectangular-shaped second aperture located adjacent to a second side edge of the panel; and
    a vertical crease centered on the panel to allow the packaging to be folded in half for shipping and storage purposes.
12. The elastic storage device of claim 11 further comprising:
    indentations on inner edges of the first aperture and the second aperture to accommodate added thickness of the elastic ribbon being folded over itself on a first end and second end thereof.
13. The elastic storage device of claim 11 wherein:
    said first adhesive anchor comprises a bottom layer, a middle layer, and a top layer wherein said first end of the elastic ribbon is folded over said middle layer of the first adhesive anchor and back onto itself being secured in place using an attachment means;
    wherein said bottom layer, middle layer, and top layer of said first adhesive anchor are adhered together to sandwich and lock said folded over first end of said elongated ribbon therein;
    said second adhesive anchor also comprises a bottom layer, a middle layer, and a top layer wherein said second end of the elastic ribbon is folded over said middle layer of the second adhesive anchor and back onto itself being secured in place using an attachment means; and
    wherein said bottom layer, middle layer, and top layer of said second adhesive anchor are adhered together to sandwich and lock said folded over second end of said elongated ribbon therein;
    an adhesive layer and peel-away cover located on a bottom surface of said first anchor; and
    an adhesive layer and peel-away cover located on a bottom surface of said second anchor.

* * * * *